(12) United States Patent
Niwa et al.

(10) Patent No.: US 10,434,887 B2
(45) Date of Patent: Oct. 8, 2019

(54) VEHICLE

(71) Applicant: Toyota Jidosha Kabushiki Kaisha, Toyota-shi, Aichi-ken (JP)

(72) Inventors: Yamato Niwa, Nisshin (JP); Toshiya Hashimoto, Miyoshi (JP); Takahiro Misawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 83 days.

(21) Appl. No.: 15/887,579

(22) Filed: Feb. 2, 2018

(65) Prior Publication Data

US 2018/0222335 A1    Aug. 9, 2018

(30) Foreign Application Priority Data

Feb. 7, 2017  (JP) ................. 2017-020105

(51) Int. Cl.
| | |
|---|---|
| B60L 11/18 | (2006.01) |
| B60L 53/14 | (2019.01) |
| B60L 53/12 | (2019.01) |
| B60L 58/12 | (2019.01) |

(52) U.S. Cl.
CPC .......... *B60L 11/1816* (2013.01); *B60L 53/12* (2019.02); *B60L 53/14* (2019.02); *B60L 58/12* (2019.02); *B60L 2240/80* (2013.01); *Y02T 10/705* (2013.01); *Y02T 10/7005* (2013.01); *Y02T 10/7044* (2013.01); *Y02T 10/7072* (2013.01); *Y02T 90/122* (2013.01); *Y02T 90/14* (2013.01)

(58) Field of Classification Search
USPC .......................................................... 320/108
See application file for complete search history.

(56) References Cited

U.S. PATENT DOCUMENTS

| | | | |
|---|---|---|---|
| 2010/0017249 A1* | 1/2010 | Fincham | .................. B60L 3/12 705/412 |
| 2011/0302078 A1* | 12/2011 | Failing | ..................... B60L 3/00 705/39 |
| 2013/0127409 A1 | 5/2013 | Ichikawa | |

(Continued)

FOREIGN PATENT DOCUMENTS

| | | |
|---|---|---|
| EP | 2810814 A1 | 12/2014 |
| JP | 2013-110822 A | 6/2013 |

(Continued)

*Primary Examiner* — Robert Grant
(74) *Attorney, Agent, or Firm* — Dinsmore & Shohl LLP

(57) ABSTRACT

A vehicle includes an electric power storage device, a charging inlet, an electric power reception device, and a controller. The controller is configured to start charging the electric power storage device when the time reaches a set time set in advance in a case where scheduled charging control that starts charging the electric power storage device at the set time is planned to be executed in a state in which electric power is receivable through either the charging inlet or the electric power reception device. The controller is configured to execute the contacted charging control by suppressing execution of the scheduled charging control that starts the contactless charging control, when the charging connector is connected to the inlet in a case where the scheduled charging control that starts the contactless charging control at the set time is planned to be executed.

6 Claims, 5 Drawing Sheets

(56) References Cited

U.S. PATENT DOCUMENTS

| | | | |
|---|---|---|---|
| 2013/0193749 A1 | 8/2013 | Nakamura et al. | |
| 2015/0008877 A1 | 1/2015 | Ichikawa et al. | |
| 2015/0183333 A1* | 7/2015 | Forbes, Jr. | B60L 11/1846 705/5 |
| 2016/0046194 A1* | 2/2016 | Tsukamoto | H02J 5/005 307/104 |
| 2016/0352113 A1* | 12/2016 | Zhao | H02J 7/0027 |

FOREIGN PATENT DOCUMENTS

| | | |
|---|---|---|
| JP | 2013-126327 A | 6/2013 |
| JP | 2013-146148 A | 7/2013 |
| JP | 2013-146154 A | 7/2013 |
| JP | 2013154815 A | 8/2013 |
| JP | 2013179723 A | 9/2013 |
| JP | 2016059248 A | 4/2016 |

* cited by examiner

VEHICLE

CROSS-REFERENCE TO RELATED APPLICATIONS

This application claims priority to Japanese Patent Application No. 2017-020105 filed on Feb. 7, 2017, incorporated herein by reference in its entirety.

BACKGROUND

1. Technical Field

The present disclosure relates to a vehicle that enables contacted charging and contactless charging of the mounted electric power storage device.

2. Description of Related Art

A vehicle that enables contacted charging and contactless charging is known in the related art. In contacted charging, an electric power storage device mounted in the vehicle is charged using electric power that is received from an electric power supply through an inlet in a state in which a connector disposed in a cable connected to the electric power supply outside the vehicle is connected to the inlet of the vehicle. In contactless charging, the electric power storage device is charged using electric power that is contactlessly received without a connection point from the electric power supply outside the vehicle. As such a vehicle, for example, a configuration that prioritizes contacted charging when the connector is connected to the vehicle during contactless charging, and stops contactless charging is disclosed in Japanese Unexamined Patent Application Publication No. 2013-179723 (JP 2013-179723 A). A known example of contactless charging is magnetic resonance charging as disclosed in Japanese Unexamined Patent Application Publication No. 2013-154815 (JP 2013-154815 A), Japanese Unexamined Patent Application Publication No. 2013-146154 (JP 2013-146154 A), Japanese Unexamined Patent Application Publication No. 2013-146148 (JP 2013-146148 A), Japanese Unexamined Patent Application Publication No. 2013-110822 (JP 2013-110822 A), and Japanese Unexamined Patent Application Publication No. 2013-126327 (JP 2013-126327 A).

SUMMARY

For example, scheduled charging that starts charging at a set time that is set in advance may be performed in such a vehicle. In such a case, for example, when the connector is connected to the inlet before the start of contactless charging in a case where execution of scheduled charging is planned to start contactless charging at the set time, the content of scheduled charging may be changed to start contacted charging at the set time. However, considering that a user connects the connector to the vehicle regardless of planned execution of scheduled charging that starts contactless charging at the set time, there is a possibility that the user expects charging to be started before the set time. Thus, when the state of waiting for scheduled charging is continued, charging may not be performed as intended by the user.

The present disclosure provides a vehicle that enables contacted charging and contactless charging and in which charging is performed by reflecting the user's intention.

An aspect of the present disclosure relates to a vehicle including an electric power storage device, a charging inlet configured to be connected to a charging connector disposed in a charging cable connected to an electric power supply outside the vehicle, an electric power reception device configured to contactlessly receive electric power from the electric power supply, and a controller configured to execute either contacted charging control to charge the electric power storage device using electric power received from the electric power supply through the charging inlet, or contactless charging control to charge the electric power storage device using electric power received from the electric power supply through the electric power reception device. The controller is configured to start charging the electric power storage device when the time reaches a set time set in advance in a case where scheduled charging control that starts charging the electric power storage device at the set time is planned to be executed in a state in which electric power is receivable through either the charging inlet or the electric power reception device. The scheduled charging control includes scheduled charging control that starts the contactless charging control, and scheduled charging control that starts the contacted charging control. The controller is configured to execute the contacted charging control by suppressing execution of the scheduled charging control that starts the contactless charging control, when the charging connector is connected to the charging inlet in a case where the scheduled charging control that starts the contactless charging control at the set time is planned to be executed.

According to the aspect of the present disclosure, when the charging connector is connected to the charging inlet in a case where the scheduled charging control that starts the contactless charging control at the set time is planned to be executed, there is a possibility that a user expects charging to be started before the set time. Thus, charging can be performed as intended by the user by suppressing execution of the scheduled charging control and executing the contacted charging control. Furthermore, since the contacted charging control is started before the set time, the user can recognize that execution of the scheduled charging control is suppressed.

In the vehicle according to the aspect of the present disclosure, the scheduled charging control that starts the contactless charging control may be suppressed by canceling planned execution of the scheduled charging control.

In the vehicle according to the aspect of the present disclosure, the controller may be configured to suppress execution of the scheduled charging control that starts the contacted charging control, when an operation of disconnecting the charging connector and the charging inlet from each other, or an operation of connecting the charging connector to the charging inlet is performed in a case where the scheduled charging control that starts the contacted charging control at the set time is planned to be executed.

According to the aspect of the present disclosure, the user can suppress execution of the scheduled charging control by performing the operation of disconnecting the charging connector and the charging inlet from each other, or the operation of connecting the charging connector to the charging inlet. That is, the user can suppress execution of the scheduled charging control by performing a simple operation of the charging connector.

In the vehicle according to the aspect of the present disclosure, the scheduled charging control that starts the contacted charging control may be suppressed by canceling planned execution of the scheduled charging control.

In the vehicle according to the aspect of the present disclosure, the controller may be configured to determine whether electric power is receivable through the electric power reception device, based on a positional relationship between the electric power reception device and an electric power transmission device configured to transmit electric power to the electric power reception device from the electric power supply outside the vehicle. The controller may be configured to start charging the electric power storage device by the contactless charging control when the time reaches the set time in a case where the scheduled charging control that starts the contactless charging control at the set time is planned to be executed in a state in which the controller determines that electric power is receivable through the electric power reception device. The controller may be configured to stop the contactless charging control when the positional relationship between the electric power reception device and the electric power transmission device is changed to the positional relationship in which the contactless charging control is not executed, or when a state of charge of the electric power storage device reaches a threshold.

The vehicle according to the aspect of the present disclosure may further include a connection detection circuit configured to detect whether the charging inlet is connected to the charging connector. The controller may be configured to determine whether the connection is made, based on a detection signal that is output from the connection detection circuit. The controller may be configured to start charging the electric power storage device by the contacted charging control when the time reaches the set time in a case where the scheduled charging control that starts the contacted charging control at the set time is planned to be executed in a state in which the controller determines that the contacted charging control is performed when the controller determines that the connection is made. The controller may be configured to stop the contacted charging control when the charging connector is detached from the charging inlet, or when a state of charge of the electric power storage device reaches a threshold.

According to the aspect of the present disclosure, a vehicle that enables contacted charging and contactless charging and in which charging is performed by reflecting the user's intention can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
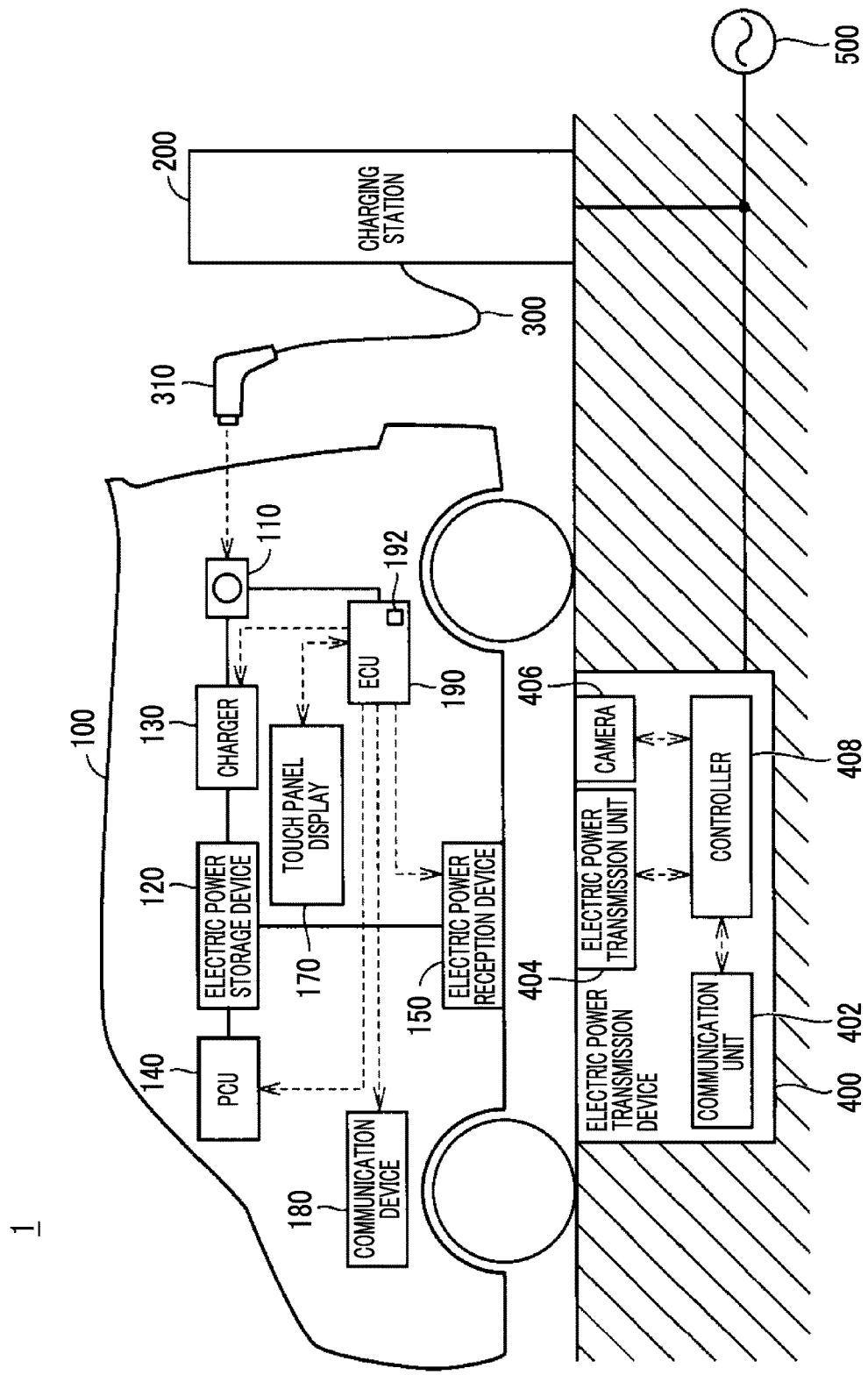
FIG. 1 is a configuration diagram of a vehicle charging system that includes a vehicle according to the present embodiment.

Hereinafter, an embodiment of the present disclosure will be described in detail with reference to the drawings. Hereinafter, the same or corresponding parts in the drawings will be designated with the same reference signs, and descriptions of such parts will not be repeated.

Configuration of Vehicle Charging System

FIG. 1 is a configuration diagram of a vehicle charging system 1 that includes a vehicle 100 according to the present embodiment. With reference to FIG. 1, the vehicle charging system 1 includes the vehicle 100, a charging station 200, a charging cable 300, a charging connector 310, an electric power transmission device 400, and a system electric power supply 500.

The vehicle 100 is, for example, an electric vehicle that uses a motor generator (not illustrated) as a drive source.

The vehicle 100 includes a charging inlet 110, an electric power storage device 120, a charger 130, a power control unit (PCU) 140, an electric power reception device 150, a touch panel display 170, a communication device 180, and an electronic control unit (ECU) 190.

The charging inlet 110 has a shape to which the charging connector 310 can be connected. The charging inlet 110 incorporates a terminal that is electrically connected to the charger 130. When the charging connector 310 is connected to the charging inlet 110, the terminal in the charging inlet 110 is in contact with a terminal that is incorporated in the charging connector 310. Accordingly, the charging inlet 110 can receive electric power from the system electric power supply 500 through the charging station 200, the charging cable 300, and the charging connector 310. Electric power received in the charging inlet 110 is output to the charger 130.

The electric power storage device 120 is an electric power storage component that is configured to be capable of being charged or discharged. The electric power storage device 120 is configured to include a secondary battery such as a lithium ion battery, a nickel-hydrogen battery, or a lead-acid battery, or an electric power storage element such as an electric double-layer capacitor.

The charger 130 is supplied with alternating current electric power from the charging station 200 through the charging inlet 110. The charger 130 converts the alternating current electric power into direct current electric power in accordance with a control signal from the ECU 190. The charger 130 steps up or steps down the output voltage of the direct current electric power to a desired voltage and supplies the direct current electric power to the electric power storage device 120. The charger 130 is configured to include, for example, a rectification circuit that converts the alternating current electric power into direct current electric power, and a converter that steps up or steps down the voltage of the direct current electric power.

The PCU 140 includes an inverter, a converter, and the like. The PCU 140 converts direct current electric power supplied from the electric power storage device 120 into alternating current electric power and supplies the alternating current electric power to the motor generator in accordance with a control signal from the ECU 190. Accordingly, traveling drive power of the vehicle 100 is generated in the motor generator. Alternatively, the PCU 140 converts alternating current electric power generated by a regenerative operation of the motor generator into direct current electric power and supplies the direct current electric power to the electric power storage device 120. Accordingly, the electric power storage device 120 can be charged.

The electric power reception device 150 contactlessly receives alternating current electric power from the electric power transmission device 400 through an electric power reception coil (that is, without a connection point between the electric power reception device 150 and the electric power transmission device 400). The electric power reception device 150 converts the alternating current electric power into direct current electric power, converts the voltage of the direct current electric power into a desired voltage, and supplies the direct current electric power to the electric power storage device 120. Accordingly, the electric power storage device 120 can be charged. A detailed configuration of the electric power reception device 150 will be described below.

The touch panel display 170, for example, is disposed in a position that can be visually recognized by a user in a driver's seat. The touch panel display 170 displays various types of information. The user performs a predetermined operation on the touch panel display 170.

The communication device 180 is configured to be capable of wirelessly communicating with a communication unit 402 of the electric power transmission device 400 that is present within the communication range of the communication device 180. The communication device 180 receives information related to a wireless power transfer (WPT) class supported by the electric power transmission device 400, information related to the amount of electric power transmitted by the electric power transmission device 400, and the like from the communication unit 402 of the electric power transmission device 400. For example, communication between the communication device 180 and the communication unit 402 of the electric power transmission device 400 is automatically established when the vehicle 100 enters the communication range of the communication unit 402 of the electric power transmission device 400, by authenticating and registering the communication in advance. For example, both of the communication device 180 and the communication unit 402 are configured with a wireless local area network (LAN) module that complies with Institute of Electrical and Electronics Engineers (IEEE) 802.11. In such a case, the communication unit 402 of the electric power transmission device 400 functions as a master device in the wireless LAN. Communication between the communication device 180 and the communication unit 402 is established in order to start, for example, contactless electric power transfer. For example, information related to starting/stopping electric power transfer, and information related to the status of electric power reception (the voltage of received electric power, the current of received electric power, the amount of received electric power, and the like) performed by the electric power reception device 150 are exchanged in communication between the communication device 180 and the communication unit 402.

The ECU 190 incorporates a central processing unit (CPU) and a memory 192, not illustrated, and controls each device (the charger 130, the PCU 140, the electric power reception device 150, the touch panel display 170, and the communication device 180) of the vehicle 100 based on information stored in the memory 192 or information from each sensor (not illustrated). Control executed by the ECU 190 is not limited to a software process and can also be processed in dedicated hardware (electronic circuit). The ECU 190 has a function as a clock (for example, a radio clock) and has a time acquisition unit (not illustrated) for acquiring the current time.

The charging station 200 is a device that is disposed outside the vehicle 100 and supplies electric power to the vehicle 100 from the system electric power supply 500. The charging cable 300 is connected to the charging station 200. The charging connector 310 is disposed at the tip end of the charging cable 300.

The electric power transmission device 400 is a device that is disposed outside the vehicle 100 and contactlessly transmits electric power to the vehicle 100 from the system electric power supply 500. The electric power transmission device 400 includes an electric power transmission unit 404, a camera 406, a controller 408, and the communication unit 402 for communication with the vehicle 100.

The communication unit 402 exchanges various types of information with the communication device 180 after communication with the communication device 180 is established as described above. The communication unit 402 is operated in accordance with a control signal from the controller 408.

The camera 406 is an imaging device that captures an image for determining whether the positional relationship between the vehicle 100 and the electric power transmission device 400 enables contactless charging. The camera 406 includes, for example, a fisheye lens and is disposed upward in the electric power transmission device 400. The camera 406 is configured to be capable of imaging, by the fisheye lens, a wide space including the electric power reception device 150 when the vehicle 100 is moved toward the electric power transmission device 400. The camera 406 images a space above the electric power transmission device 400 in accordance with a control signal from the controller 408.

Figure 2:
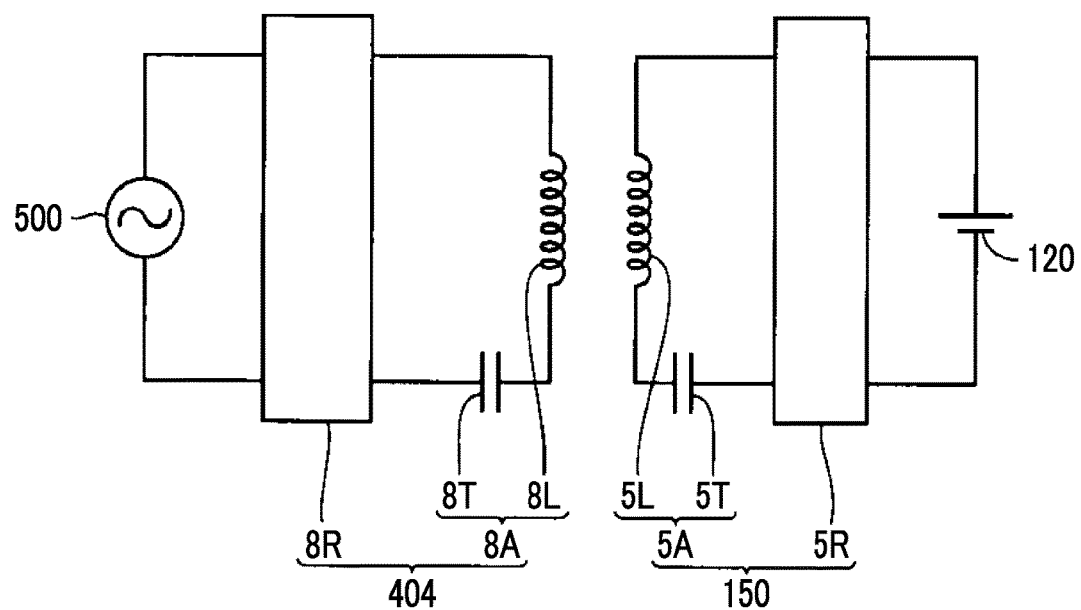
FIG. 2 is a circuit diagram schematically illustrating an electric power reception system for contactless charging.

The electric power transmission unit 404 is configured with an electric power transmission coil and the like. Hereinafter, a detailed configuration of an electric power reception system configured with the electric power reception device 150 and the electric power transmission unit 404 for contactless charging will be described. FIG. 2 is a circuit diagram schematically illustrating the electric power reception system for contactless charging. As illustrated in FIG. 2, the electric power reception device 150 includes a resonator 5A and a rectifier 5R that converts alternating current electric power received by the resonator 5A into direct current electric power and supplies the direct current electric power to the electric power storage device 120. The resonator 5A is an LC resonator and includes an electric power reception coil 5L and a capacitor 5T that are connected to the rectifier 5R. The Q factor of the resonator 5A is greater than or equal to 100.

The electric power transmission unit 404 includes a resonator 8A and a converter 8R that is connected to the system electric power supply 500. The converter 8R adjusts the frequency and voltage of alternating current electric power supplied from the system electric power supply 500, and supplies the adjusted alternating current electric power to the resonator 8A. The resonator 8A is an LC resonator and includes an electric power transmission coil 8L and a capacitor 8T that are connected to the converter 8R. The Q factor of the resonator 8A is greater than or equal to 100. The resonant frequency of the resonator 8A substantially matches the resonant frequency of the resonator 5A.

In the configuration described heretofore, either contacted charging control for charging the electric power storage device 120 mounted in the vehicle 100 using electric power charged from the charging station 200 through the charging cable 300 and the charging connector 310, or contactless charging control for charging the electric power storage device 120 using electric power received from the electric power transmission device 400 may be executed in the vehicle 100.

In the present embodiment, for example, the ECU 190 executes executable charging control when the state of the vehicle 100 is changed to enable either the contacted charging control or the contactless charging control. Hereinafter, each charging control will be described.

Contacted Charging Control

The ECU 190, for example, executes the contacted charging control when the charging connector 310 is connected to the charging inlet 110.

The ECU 190, for example, uses a connection detection circuit (not illustrated) to detect whether the charging connector 310 is connected to the charging inlet 110. Specifically, the connection detection circuit outputs an ON signal to the ECU 190 when the charging connector 310 is connected to the charging inlet 110. The connection detection circuit stops outputting the ON signal when the charging connector 310 is detached from the charging inlet 110 (that is, when the charging connector 310 and the charging inlet 110 are disconnected from each other). For example, the connection detection circuit may be configured with a switch, or may be configured with an electric circuit in which the circuit resistance is changed by connecting the charging connector 310 to the charging inlet 110. When the ECU 190 receives the ON signal from the connection detection circuit, the ECU 190 determines that the charging connector 310 is connected to the charging inlet 110 (that is, a state in which the contacted charging control can be executed), and executes the contacted charging control.

When the ECU 190 starts the contacted charging control, the ECU 190 acquires information related to the contacted charging control such as the amount of electric power supplied by the charging station 200, from a pilot signal (CPLT) that is received from the charging station 200 through the charging cable 300. The ECU 190 controls the charger 130 based on the acquired information. The ECU 190 stops the contacted charging control when the charging connector 310 is detached from the charging inlet 110, or when the state of charge (SOC) of the electric power storage device 120 reaches a threshold (an SOC corresponding to the full state of charge).

Contactless Charging Control

The ECU 190 executes the contactless charging control when the positional relationship between the vehicle 100 and the electric power transmission device 400 is changed to enable execution of the contactless charging control.

The ECU 190 determines whether the positional relationship between the vehicle 100 and the electric power transmission device 400 enables execution of the contactless charging control, based on the image data of the camera 406 transmitted from the electric power transmission device 400.

The controller 408 of the electric power transmission device 400 starts the camera 406 when communication is established between the communication unit 402 and the communication device 180. When the camera 406 is started, the camera 406 images the space above the electric power transmission device 400 and transmits the captured image data to the controller 408. The controller 408 acquires the image data from the camera 406 and transmits the acquired image data to the ECU 190 through the communication unit 402. A mark for specifying the position of the electric power reception device 150 from the captured image data is disposed in a predetermined location on the lower surface (a surface facing the electric power transmission device 400) of the electric power reception device 150.

The ECU 190 specifies the mark from the image data received from the electric power transmission device 400 and calculates the relative positional relationship (a distance in the horizontal direction and a distance in the vertical direction) between the vehicle 100 (electric power reception device 150) and the electric power transmission device 400 based on the position and size of the specified mark in the image data. When the ECU 190 determines that the positional relationship between the vehicle 100 and the electric power transmission device 400 enables execution of the contactless charging control (for example, a positional relationship in which the distance in the horizontal direction and the distance in the vertical direction are within a predetermined range) (that is, a state in which the contactless charging control can be executed), the ECU 190 executes the contactless charging control in cooperation with the electric power transmission device 400.

The ECU 190 stops the contactless charging control when the positional relationship between the vehicle 100 and the electric power transmission device 400 does not enable execution of the contactless charging control, or when the SOC of the electric power storage device 120 reaches the threshold.

Scheduled Charging Control

Even in a state in which the vehicle 100 can execute the contacted charging control and the contactless charging control, the ECU 190 waits until a time that is set in advance (hereinafter, referred to as a set time), when scheduled charging control that starts the charging control at the set time is planned to be executed. When the set time is reached, the ECU 190 executes the charging control.

The set time, for example, may be set by the user inputting the set time on the touch panel display 170, and may be stored in a predetermined storage area of the memory 192. Alternatively, the set time may be stored in advance in the predetermined storage area of the memory 192 of the ECU 190.

When the user operates the touch panel display 170 to request execution of the scheduled charging control at the set time, the ECU 190 stores, in the memory 192, information that indicates that a scheduled charging control execution flag is in an ON state (that is, information that indicates that the scheduled charging control is planned to be executed). For example, the user can request execution of the scheduled charging control by selecting any one of the contacted charging control and the contactless charging control by operating the touch panel display 170. The ECU 190 stores, in the memory 192, information of the type of charging control that is executed as the scheduled charging control in response to the request of the user, along with the set time and information indicating that the scheduled charging control is planned to be executed.

The ECU 190, for example, executes sleep control until the set time when the predetermined storage area of the memory 192 stores information indicating that the scheduled charging control is planned to be executed, information indicating that execution of the contactless charging control is selected as the scheduled charging control, and the set time in a state in which the contactless charging control can be executed. For example, the sleep control refers to control of setting a part of a plurality of electric devices mounted in the vehicle 100 to a standstill state such that use of a part of the function of the vehicle 100 is restricted, and that the electric power consumption of the vehicle 100 becomes lower than before the restriction. The ECU 190 ends the sleep control and executes the contactless charging control at the set time when the time reaches the set time.

Alternatively, the ECU 190, for example, executes the sleep control until the set time when the predetermined storage area of the memory 192 stores information indicating that the scheduled charging control is planned to be executed, information indicating that execution of the contacted charging control is selected as the scheduled charging control, and the set time in a state in which the contacted charging control can be executed. The ECU 190 ends the sleep control and executes the contacted charging control at the set time when the time reaches the set time. The sleep control may be ended at a time point before the set time.

It is assumed that, for example, the vehicle 100 having the configuration described heretofore is moved to a position in which the contactless charging control can be executed, and that the position to which the vehicle 100 is moved is a position in which the charging connector 310 can be connected to the charging inlet 110, as illustrated in FIG. 1. Furthermore, it is assumed that the contactless charging control is planned to be executed as the scheduled charging control. The vehicle 100 waits until the set time at which the contactless charging control is executed. In such a case, when the charging connector 310 is connected to the charging inlet 110 before the start of the contactless charging control, the ECU 190, for example, may change the control content of the scheduled charging control to start the contacted charging control at the set time.

However, considering that the user connects the charging connector 310 to the charging inlet 110 before the set time regardless of the contactless charging control that is planned to be executed as the scheduled charging control, there is a possibility that the user expects the contacted charging control to be started before the set time. In such a case, when the state in which the scheduled charging control is planned to be executed is continued, the charging control may not be executed as intended by the user.

In the present embodiment, when the charging connector 310 is connected to the charging inlet 110 in a case where the contactless charging control is planned to be executed as the scheduled charging control, the ECU 190 suppresses execution of the scheduled charging control and executes the contacted charging control before the set time.

When the charging connector 310 is connected to the charging inlet 110, there is a possibility that the user expects the contacted charging control to be started before the set time. Thus, the charging control can be executed as intended by the user by suppressing execution of the scheduled charging control and executing the contacted charging control before the set time.

Figure 3:
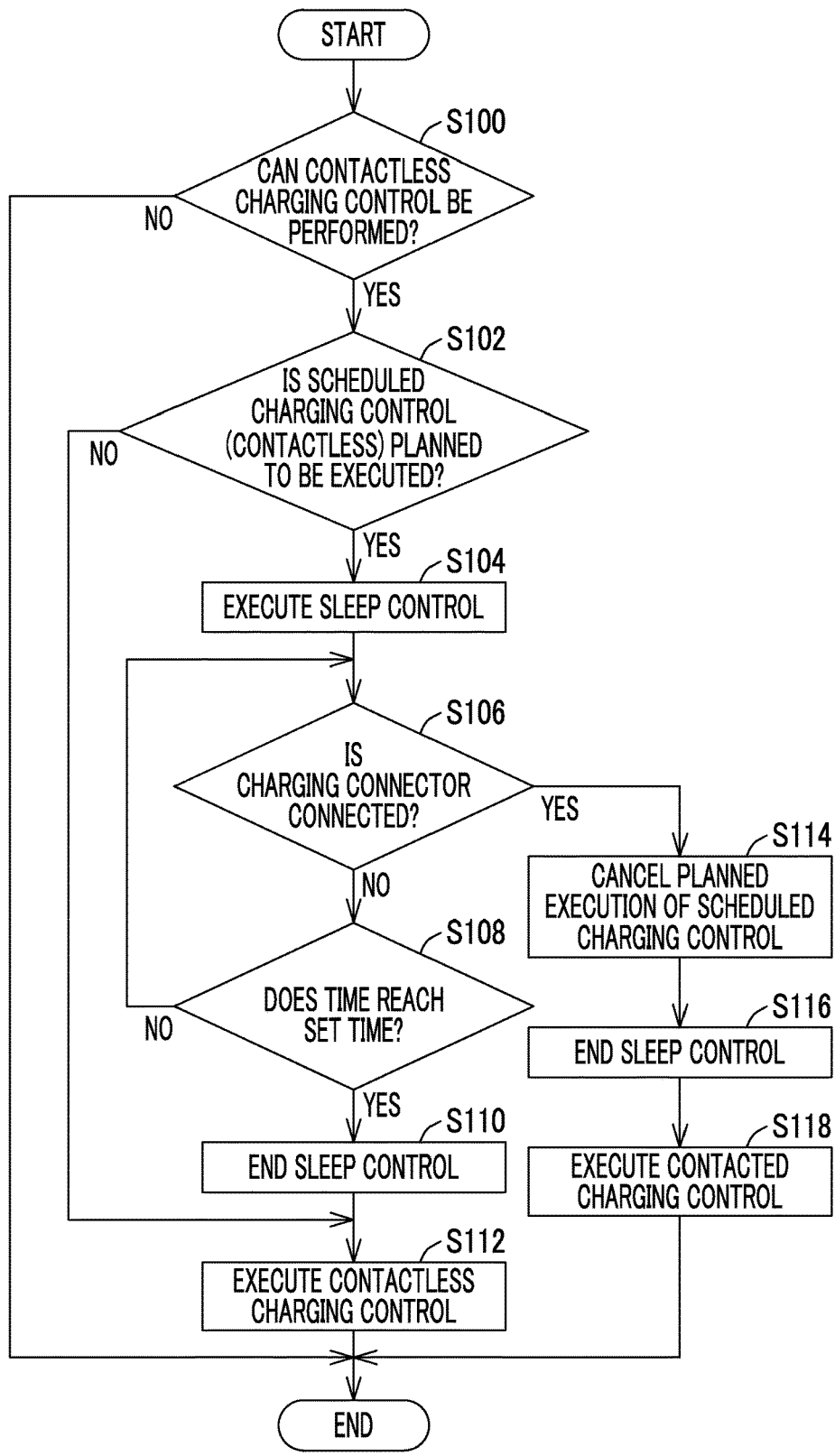
FIG. 3 is a flowchart illustrating a control process that is executed in an ECU in the present embodiment.

A control process that is executed in the ECU 190 mounted in the vehicle 100 according to the present embodiment will be described with reference to FIG. 3. FIG. 3 is a flowchart illustrating the control process that is executed in the ECU 190 in the present embodiment.

In step (hereinafter, a step will be denoted by S) 100, the ECU 190 determines whether the state of the vehicle 100 enables execution of the contactless charging control. When the ECU 190 determines that the state of the vehicle 100 enables execution of the contactless charging control (YES in S100), the process transitions to S102.

In S102, the ECU 190 determines whether the contactless charging control is planned to be executed as the scheduled charging control. The ECU 190 determines that the contactless charging control is planned to be executed as the scheduled charging control, when the predetermined storage area of the memory 192 stores information indicating that the scheduled charging control is planned to be executed, information indicating that execution of the contactless charging control is selected as the scheduled charging control, and the set time. When the ECU 190 determines that the contactless charging control is planned to be executed as the scheduled charging control (YES in S102), the process transitions to S104.

In S104, the ECU 190 executes the sleep control. In S106, the ECU 190 determines whether the charging connector 310 is connected to the charging inlet 110. When the ECU 190 determines that the charging connector 310 is connected to the charging inlet 110 (YES in S106), the process transitions to S114. When the ECU 190 determines that the charging connector 310 is not connected to the charging inlet 110 (NO in S106), the process transitions to S108.

In S108, the ECU 190 determines whether the time reaches the set time. When the ECU 190 determines that the time reaches the set time (YES in S108), the process transitions to S110.

In S110, the ECU 190 ends the sleep control. In S112, the ECU 190 executes the contactless charging control.

When the ECU 190 determines that the charging connector 310 is connected to the charging inlet 110 (YES in S106), the ECU 190 cancels planned execution of the scheduled charging control in S114. Specifically, for example, the ECU 190 cancels planned execution of the scheduled charging control by deleting information indicating that the scheduled charging control is planned to be executed, information indicating that execution of the contactless charging control is selected as the scheduled charging control, and the set time stored in the predetermined storage area. In such a case, for example, the ECU 190 may suppress execution of the scheduled charging control by prohibiting execution of the scheduled charging control regardless of information stored in the predetermined storage area. The ECU 190 may cancel planned execution of the scheduled charging control by deleting solely information indicating that the scheduled charging control is planned to be executed.

In S116, the ECU 190 ends the sleep control. In S118, the ECU 190 executes the contacted charging control.

When the ECU 190 in S100 determines that the state of the vehicle 100 does not enable execution of the contactless charging control (NO in S100), the process is finished. When the ECU 190 determines that the scheduled charging control is not planned to be executed (NO in S102), the process transitions to S112, and the contactless charging control is executed immediately. When the ECU 190 determines that the time does not reach the set time (NO in S108), the process returns to S106.

Figure 4:
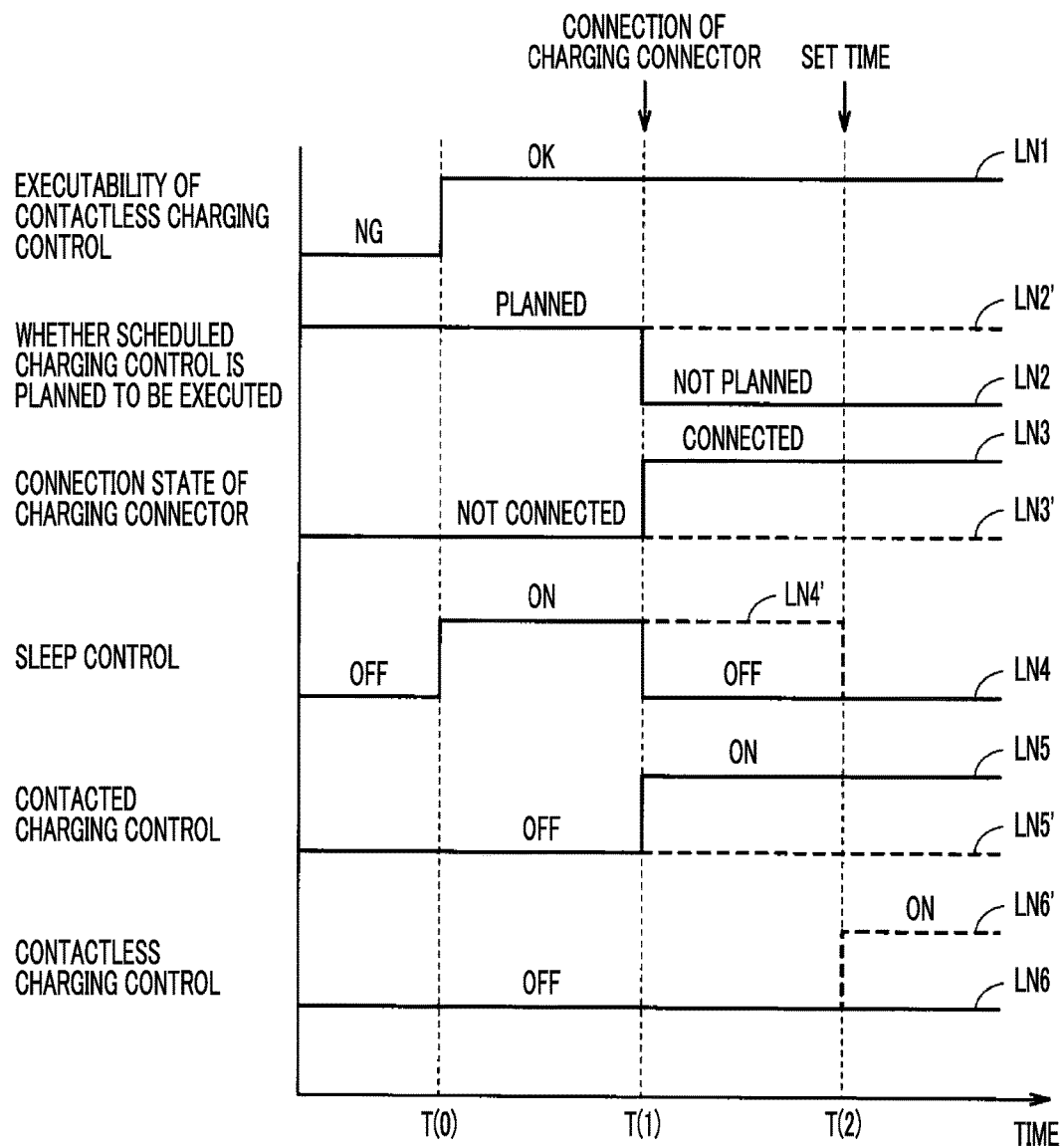
FIG. 4 is a timing chart for describing operation of the ECU in the present embodiment.

Operation of the ECU 190 mounted in the vehicle 100 according to the present embodiment will be described with reference to FIG. 4 based on the configuration and the flowchart described heretofore. FIG. 4 is a diagram for describing operation of the ECU 190 in the present embodiment.

The horizontal axis in FIG. 4 denotes time. The vertical axis in FIG. 4 denotes executability of the contactless charging control, whether or not the scheduled charging control is executed, the connection state of the charging connector 310 to the charging inlet 110, whether or not the sleep control is executed, whether or not the contacted charging control is executed, and whether or not the contactless charging control is executed. That is, a change in the availability of contactless charging is illustrated by LN1 in FIG. 4. A change in whether or not the scheduled charging control is executed is illustrated by LN2 and LN2' in FIG. 4. A change in the connection state of the charging connector 310 to the charging inlet 110 is illustrated by LN3 and LN3' in FIG. 4. A change in whether or not the sleep control is executed is illustrated by LN4 and LN4' in FIG. 4. A change in whether or not the contacted charging control is executed is illustrated by LN5 and LN5' in FIG. 4. A change in whether or not the contactless charging control is executed is illustrated by LN6 and LN6' in FIG. 4.

For example, it is assumed that contactless charging is planned to be executed as the scheduled charging control, and that the positional relationship between the vehicle 100 and the electric power transmission device 400 does not enable execution of contactless charging. When the vehicle 100 enters the communication range of the electric power transmission device 400, communication is established between the communication device 180 of the vehicle 100 and the communication unit 402 of the electric power transmission device 400. The camera 406 is started, and the image data captured by the camera 406 is transmitted to the vehicle 100. When the vehicle 100 is moved, and the ECU 190, based on the received image data, determines that the positional relationship between the vehicle 100 and the electric power transmission device 400 is changed to enable execution of the contactless charging control, the ECU 190 determines that the contactless charging control can be executed (YES in S100), as illustrated by LN1 in FIG. 4. Since the contactless charging control is planned to be executed as the scheduled charging control (YES in S102) as illustrated by LN2 in FIG. 4, the sleep control is executed (S104) as illustrated by LN4 in FIG. 4.

When the charging connector 310 is connected to the charging inlet 110 at time T(1) (YES in S106) as illustrated by LN3 in FIG. 4, planned execution of the scheduled charging control is canceled (S114) as illustrated by LN2 in FIG. 4. The sleep control is ended (S116) as illustrated by LN4 in FIG. 4, and the contacted charging control is executed (S118) as illustrated by LN5 in FIG. 4.

When the charging connector 310 is not connected to the charging inlet 110 at time T(1) (NO in S106) as illustrated by LN3' in FIG. 4, the state in which the scheduled charging control is planned to be executed is continued as illustrated by LN2' in FIG. 4. Thus, when the time reaches the set time at time T(2) (YES in S108), the sleep control is ended (S110) as illustrated by LN4' in FIG. 4, and the contactless charging control is executed (S112) as illustrated by LN6' in FIG. 4. Thus, the contacted charging control is not executed as illustrated by LN5' in FIG. 4.

As described heretofore, in the vehicle according to the present embodiment, when the charging connector 310 is connected to the charging inlet 110 in a case where the scheduled charging control that starts the contactless charging control at the set time is planned to be executed, there is a possibility that the user expects charging to be started before the set time. Thus, when the charging connector 310 is connected to the charging inlet 110, charging can be performed as intended by the user by suppressing execution of the scheduled charging control and executing the contacted charging control. Furthermore, since the contacted charging control is started before the set time, the user can recognize that execution of the scheduled charging control is suppressed. Accordingly, an electric vehicle that enables contacted charging and contactless charging and in which charging can be performed by reflecting the user's intention can be provided.

Hereinafter, a modification example will be described. While the embodiment illustratively describes the vehicle 100 as an electric vehicle, the vehicle 100 is not particularly limited to an electric vehicle, provided that the vehicle 100 is a vehicle in which a vehicle-mounted electric power storage device can be charged by either contacted charging or contactless charging using an external electric power supply. For example, the vehicle 100 may be a hybrid vehicle or a vehicle that uses an engine as a drive source.

While, in the embodiment described above, a determination as to whether the state of the vehicle 100 enables execution of the contactless charging control is performed based on the image data of the space above the electric power transmission device 400 captured by the camera 406, a determination as to whether the state of the vehicle 100 enables execution of the contactless charging control can be performed by, for example, using a switch that outputs an ON signal to the electric power transmission device 400 when being in contact with a wheel of the vehicle 100 at a stoppage of the wheel. For example, when the ECU 190 receives, from the electric power transmission device 400, information that indicates that the ON signal is output from the switch, the ECU 190 may determine that the state of the vehicle 100 enables execution of the contactless charging control. Alternatively, the ECU 190 may determine whether the state of the vehicle 100 enables execution of the contactless charging control, using a camera that images the vehicle 100 from above in a parking area. For example, the camera transmits the image data captured from above in the parking area to the electric power transmission device 400. The electric power transmission device 400 transmits the image data received from the camera to the ECU 190. The ECU 190 specifies the position of the vehicle 100 in the parking area from the received image data. When the specified position of the vehicle 100 is within a predetermined range in which electric power can be transferred to the electric power reception device 150 from the electric power transmission device 400, the ECU 190 determines that the state of the vehicle 100 enables execution of the contactless charging control.

While, in the embodiment described above, the contacted charging control is executed, by reflecting the user's intention as much as possible, at a time point when the charging connector 310 is connected to the charging inlet 110 in a case where the contactless charging control at the set time is planned to be executed as the scheduled charging control, execution of the contacted charging control is not particularly limited to the time point of connection, provided that the contacted charging control is executed at a time point before the set time. For example, the contacted charging control may be executed after a predetermined time period elapses from the time point of connection. For example, the predetermined time period may be set as a time period in which a process of notifying the user that contacted charging will be executed is completed.

While the embodiment describes magnetic resonance charging control as one aspect of the contactless charging control and a configuration for executing the charging control, the contactless charging control is not particularly limited to magnetic resonance charging control. For example, the contactless charging control may employ electromagnetic induction charging control, charging control by receiving a radio wave, and the like.

While, in the embodiment described above, the contacted charging control is executed when the charging connector 310 is connected to the charging inlet 110 before the start of the contactless charging control in a case where the scheduled charging control is planned to be executed in a state in which the contactless charging control can be executed, the following operation may also be performed. For example, the ECU 190 may stop the contactless charging control and execute the contacted charging control even when the charging connector 310 is connected to the charging inlet 110 after the start of the contactless charging control (after the set time).

While, in the embodiment described above, the contactless charging control is automatically started when the scheduled charging control is not planned to be executed in a state in which the contactless charging control can be executed, the following operation may also be performed. For example, the ECU 190 may ask the user through the touch panel display 170 whether or not to immediately start the contactless charging control when the scheduled charging control is not planned to be executed in a state in which the contactless charging control can be executed. The ECU 190 may start the contactless charging control when the ECU 190 receives an instruction to start the contactless charging control from the user through the touch panel display 170. Alternatively, a switch that starts the contactless charging control may be disposed in the electric power transmission device 400 or the charging station, and the ECU 190 may start the contactless charging control when the user operates the switch to be in an ON state.

While, in the embodiment described above, connection of the charging connector 310 to the charging inlet 110 suppresses execution of the scheduled charging control when the contactless charging control is planned to be executed as the scheduled charging control in a state in which the contactless charging control can be executed, the following operation may also be performed in such a case. For example, an operation of attaching or detaching the charging connector 310 may cause the ECU 190 to suppress execution of the scheduled charging control when the contacted charging control is planned to be executed as the scheduled charging control in a state in which the contacted charging control can be executed while the contactless charging control cannot be executed.

Figure 5:
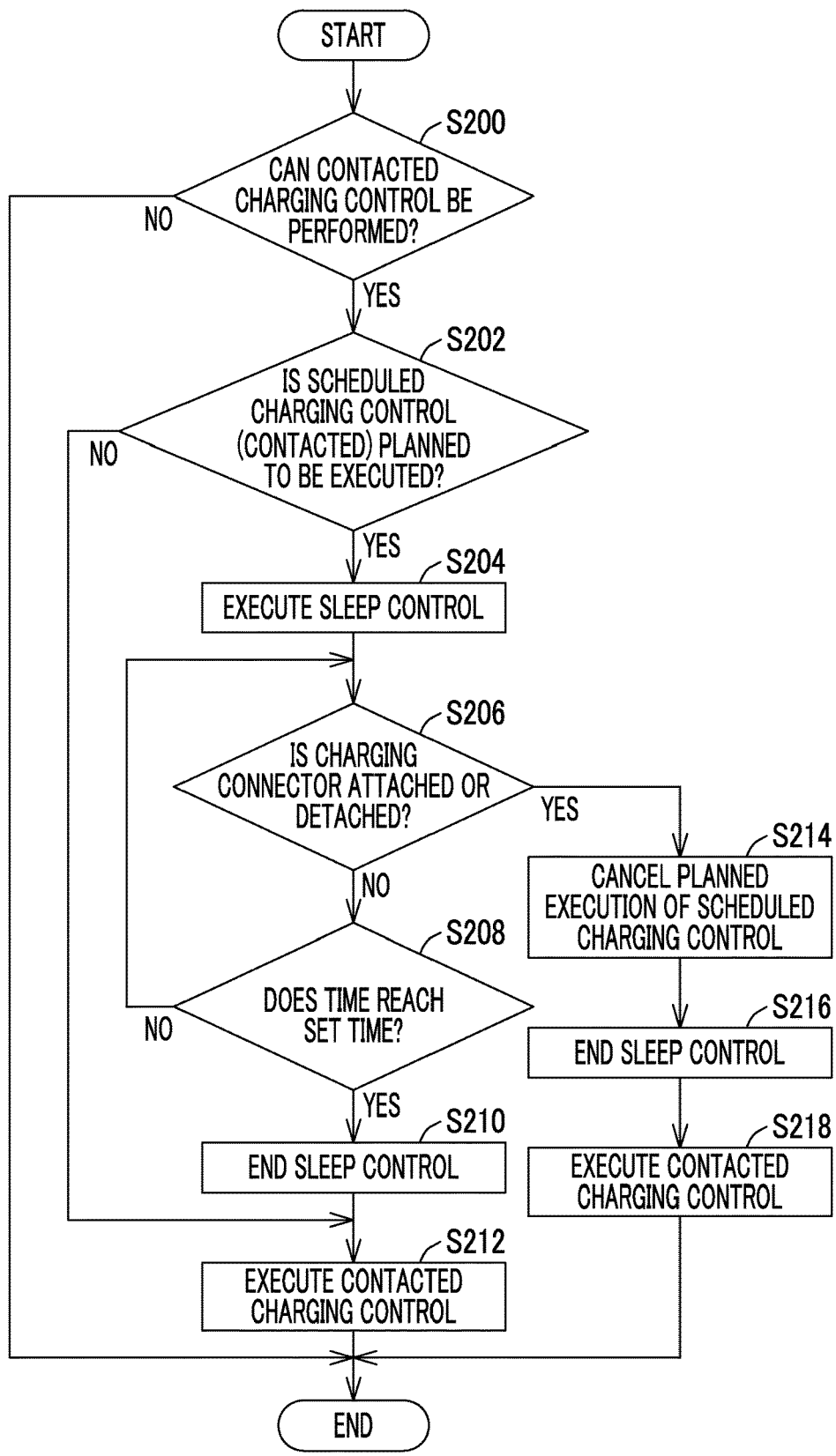
FIG. 5 is a flowchart illustrating a control process executed in an ECU in a modification example.

Hereinafter, one example of a control process that is executed in the ECU 190 in the modification example will be described using FIG. 5. FIG. 5 is a flowchart illustrating the control process that is executed in the ECU 190 in the modification example.

In S200, the ECU 190 determines whether the state of the vehicle 100 enables execution of the contacted charging control. Specifically, when the charging connector 310 is connected to the charging inlet 110, the ECU 190 determines that the state of the vehicle 100 enables execution of the contacted charging control. A method of determining whether or the charging connector 310 is connected to the charging inlet 110 is the same as described above. Thus, a detailed description of the determination method will not be repeated. When the ECU 190 determines that the state of the vehicle 100 enables execution of the contacted charging control (YES in S200), the process transitions to S202.

In S202, the ECU 190 determines whether the contacted charging control is planned to be executed as the scheduled charging control. The ECU 190 determines that the contacted charging control is planned to be executed as the scheduled charging control, when the predetermined storage area of the memory 192 stores information indicating that the scheduled charging control is planned to be executed, information indicating that execution of the contacted charging control is selected as the scheduled charging control, and the set time. When the ECU 190 determines that the contacted charging control is planned to be executed as the scheduled charging control (YES in S202), the process transitions to S204.

In S204, the ECU 190 executes the sleep control. In S206, the ECU 190 determines whether the operation of attaching or detaching the charging connector 310 is performed. The operation of attaching or detaching the charging connector 310 includes a first operation that disconnects the charging connector 310 and the charging inlet 110 from each other, and a second operation that connects the charging connector 310 to the charging inlet 110. The operation of attaching or detaching the charging connector 310 may include an operation of repeating the first operation and the second operation a predetermined number of times. When the ECU 190 determines that the operation of attaching or detaching the charging connector 310 is performed (YES in S206), the process transitions to S214. When the ECU 190 determines that the operation of attaching or detaching the charging connector 310 is not performed (NO in S206), the process transitions to S208.

In S208, the ECU 190 determines whether the time reaches the set time. When the ECU 190 determines that the time reaches the set time (YES in S208), the process transitions to S210. In S210, the ECU 190 ends the sleep control. In S212, the ECU 190 executes the contacted charging control.

When the ECU 190 determines that the charging connector 310 is connected to the charging inlet 110 (YES in S206), the ECU 190 cancels planned execution of the scheduled charging control in S214. Specifically, the ECU 190 cancels planned execution of the scheduled charging control by deleting at least information, stored in the predetermined storage area, indicating that the scheduled charging control is planned to be executed.

In S216, the ECU 190 ends the sleep control. In S218, the ECU 190 executes the contacted charging control.

When the ECU 190 in S200 determines that the state of the vehicle 100 does not enable execution of the contacted charging control (NO in S200), the process is finished. When the ECU 190 determines that the scheduled charging control is not planned to be executed (NO in S202), the process transitions to S212, and the contacted charging control is executed immediately. When the ECU 190 determines that the time does not reach the set time (NO in S208), the process returns to S206.

Operation of the ECU 190 in the modification example will be described based on the flowchart described heretofore.

For example, it is assumed that the state of the vehicle 100 does not enable execution of contactless charging, that contacted charging is planned to be executed as the scheduled charging control, and that the charging connector 310 is not connected to the charging inlet 110. When the user connects the charging connector 310 to the charging inlet, the ECU 190 determines that the state of the vehicle 100 enables execution of the contacted charging control (YES in S200). Since the contacted charging control is planned to be executed as the scheduled charging control (YES in S202), the sleep control is executed (S204).

When the operation of attaching or detaching the charging connector 310 is performed during execution of the sleep control (YES in S206), planned execution of the scheduled charging control is canceled (S214). The sleep control is ended (S216), and the contacted charging control is executed (S218).

When the operation of attaching or detaching the charging connector 310 is not performed (NO in S206), and the time reaches the set time (YES in S208), the sleep control is ended (S210), and the contacted charging control is executed (S212).

As described above, when the contacted charging control is planned to be executed as the scheduled charging control in a state in which the contacted charging control can be executed, planned execution of the scheduled charging control can be canceled by performing the operation of attaching or detaching the charging connector 310. That is, the user can suppress execution of the scheduled charging control by performing a simple operation of the charging connector 310.

The modification example may be embodied by combining all or a part of the control process. The embodiment disclosed herein is for illustrative purposes from every point of view and should not be considered restrictive. The scope of the present disclosure is not disclosed by the description and is disclosed by the claims, and is intended to include all changes made within the equivalent meaning and scope of the claims.

What is claimed is:

1. A vehicle comprising:
    an electric power storage device;
    a charging inlet configured to be connected to a charging connector disposed in a charging cable connected to an electric power supply outside the vehicle;
    an electric power reception device configured to contactlessly receive electric power from the electric power supply; and
    a controller configured to execute either contacted charging control to charge the electric power storage device using electric power received from the electric power supply through the charging inlet, or contactless charging control to charge the electric power storage device using electric power received from the electric power supply through the electric power reception device, wherein:
    the controller is configured to start charging the electric power storage device when the time reaches a set time set in advance in a case where scheduled charging control that starts charging the electric power storage device at the set time is planned to be executed in a state in which electric power is receivable through either the charging inlet or the electric power reception device;
    the scheduled charging control includes scheduled charging control that starts the contactless charging control, and scheduled charging control that starts the contacted charging control; and
    the controller is configured to execute the contacted charging control by suppressing execution of the scheduled charging control that starts the contactless charging control, when the charging connector is connected to the charging inlet in a case where the scheduled charging control that starts the contactless charging control at the set time is planned to be executed.

2. The vehicle according to claim 1, wherein execution of the scheduled charging control that starts the contactless charging control is suppressed by canceling planned execution of the scheduled charging control.

3. The vehicle according to claim 1, wherein the controller is configured to suppress execution of the scheduled charging control that starts the contacted charging control, when an operation of disconnecting the charging connector and the charging inlet from each other, or an operation of connecting the charging connector to the charging inlet is performed in the case where the scheduled charging control that starts the contacted charging control at the set time is planned to be executed.

4. The vehicle according to claim 3, wherein execution of the scheduled charging control that starts the contacted charging control is suppressed by canceling planned execution of the scheduled charging control.

5. The vehicle according to claim 1, wherein:
    the controller is configured to determine whether electric power is receivable through the electric power reception device, based on a positional relationship between the electric power reception device and an electric power transmission device configured to transmit electric power to the electric power reception device from the electric power supply outside the vehicle;
    the controller is configured to start charging the electric power storage device by the contactless charging control when the time reaches the set time in a case where the scheduled charging control that starts the contactless charging control at the set time is planned to be executed in a state in which the controller determines that electric power is receivable through the electric power reception device; and
    the controller is configured to stop the contactless charging control when the positional relationship between the electric power reception device and the electric power transmission device is changed to the positional relationship in which the contactless charging control is not executed, or when a state of charge of the electric power storage device reaches a threshold.

6. The vehicle according to claim 1, further comprising a connection detection circuit configured to detect whether the charging inlet is connected to the charging connector, wherein:
    the controller is configured to determine whether the connection is made, based on a detection signal that is output from the connection detection circuit;
    the controller is configured to start charging the electric power storage device by the contacted charging control when the time reaches the set time in a case where the scheduled charging control that starts the contacted charging control at the set time is planned to be executed in a state in which the controller determines that the contacted charging control is performed when the controller determines that the connection is made; and
    the controller is configured to stop the contacted charging control when the charging connector is detached from the charging inlet, or when a state of charge of the electric power storage device reaches a threshold.

* * * * *